(12) United States Patent
Bauer et al.

(10) Patent No.: US 6,188,673 B1
(45) Date of Patent: Feb. 13, 2001

(54) USING WEB PAGE HIT STATISTICS TO ANTICIPATE CALL CENTER TRAFFIC

(75) Inventors: David L. Bauer, Cherry Hills Village; Tore L. Christensen, Boulder, both of CO (US)

(73) Assignee: Avaya Technology Corp., Miami Lakes, FL (US)

( * ) Notice: Under 35 U.S.C. 154(b), the term of this patent shall be extended for 0 days.

(21) Appl. No.: 08/922,468

(22) Filed: Sep. 2, 1997

(51) Int. Cl.[7] .............................. H04J 1/16; H04J 3/14; H04L 12/66; H04L 1/00
(52) U.S. Cl. ...................... 370/252; 370/352; 709/203; 707/10
(58) Field of Search ...................... 379/265, 266, 379/220, 112, 113, 114, 309; 370/352, 354, 356, 410, 522, 752; 709/203; 707/10

(56) References Cited

U.S. PATENT DOCUMENTS

| | | | |
|---|---|---|---|
| 5,185,780 | * | 2/1993 | Leggett .................................. 379/34 |
| 5,206,903 | * | 4/1993 | Kohler et al. ......................... 379/309 |
| 5,506,898 | | 4/1996 | Costantini et al. ................... 379/266 |
| 5,684,872 | * | 11/1997 | Flockhart et al. .................... 379/266 |
| 5,825,869 | * | 10/1998 | Brooks et al. ........................ 379/265 |
| 5,884,032 | * | 3/1999 | Bateman et al. ...................... 709/204 |
| 5,903,641 | * | 5/1999 | Tonisson ................................ 379/266 |
| 5,911,134 | * | 6/1999 | Castonguay et al. .................... 705/9 |
| 5,991,394 | * | 11/1999 | Dezonno et al. ..................... 379/265 |

FOREIGN PATENT DOCUMENTS

| | | | |
|---|---|---|---|
| 0740445 | 10/1996 | (EP) | ............................... H04L/29/06 |
| 0802664 | 10/1997 | (EP) | ............................... H04M/3/50 |
| 9207318 | 4/1992 | (WO) | .............................. G06F/3/147 |
| 9750235 | 12/1997 | (WO) | ............................... H04M/3/50 |

OTHER PUBLICATIONS

Z. Grigonis, Rockwell Teams with Dialogic to Build Groupware Servers for Small Centers, Computer Telephony, Apr. 1996, vol. 4, Iss. 4, p. 112.

U.S. Patent Application, Coffman–Haserodt 3–2, Serial No. 08/749298, Extending Internet Calls to a Telephony Call Center, Filed Nov. 14, 1996.

* cited by examiner

Primary Examiner—David R. Vincent
(74) Attorney, Agent, or Firm—David Volejnicek

(57) ABSTRACT

In a call center (106) associated with a World-Wide Web site whose pages (121, 122) provide a call-request capability (115), the call center receives notifications of page hits and call requests from the Web server (103) and uses these notifications to determine a historical page hits-to-call requests ratio. It then uses the ratio along with current page-hit notifications to predict a volume of calls that will soon need to be handled by the call center and staffing the call center in anticipation of the predicted call volume. The notifications are further used in conjunction with knowledge of information about the content of the Web pages to predict what agent skills will be needed to handle the calls, and to staff agent splits accordingly.

21 Claims, 2 Drawing Sheets

USING WEB PAGE HIT STATISTICS TO ANTICIPATE CALL CENTER TRAFFIC

TECHNICAL FIELD

This invention relates to communications networks and to call centers.

BACKGROUND OF THE INVENTION

Call centers that handle inbound calls have traditionally been managed in a reactive mode: call center supervisors staffed and released agents and moved agents between splits in response to peaks and valleys in call volumes as reflected in the lengths of queues of incoming calls waiting to be handled. This is undesirable, because the inherent delay in responding to changing call volumes and types causes the responses to lag behind the changing conditions. Therefore, proactive call-center management information systems have been developed which try to anticipate call volumes and types, and changes therein, and thereby try to eliminate the delay between changing conditions and responses thereto. An example of such a system is disclosed in U.S. Pat. No. 5,185,780. Such proactive systems typically use historical data from previous days or other time periods to predict agent staffing and agent skill needs. However, it is difficult to anticipate short-term changes in call volumes and types accurately from such data e.g., intra-hour or even shorter fluctuations in calling volumes and types.

Recently, call centers have come into existence that are able to interact with users of the Internet. They usually work as follows. An Internet user uses a browser on his or her Internet terminal to contact a World-Wide Web page of a call-center customer on a Web server, in a conventional manner. The page may have a virtual button or some other software-based indicator by means of which the user may indicate a desire to speak with a representative of the customer. If the user makes use of the indicator, the user is prompted to enter his or her telephone number. This number is conveyed to the server, which in turn sends it to the customer's call center. The call center then uses the supplied telephone number to place a standard outbound call to the user's telephone. An illustrative example of such a call center is disclosed in "Rockwell Teams with Dialogic to Build Groupware Servers for Small Centers", *Computer Telephony*, Vol. 4, Issue 4 (April 1996), p.112.

SUMMARY OF THE INVENTION

Applicants have realized that numbers of hits on the World-Wide Web page or pages (that is, the number of accesses to the Web page or pages) of a call center client serve as an indicator, or predictor, of the volume or type of calls that the call center will soon have to handle, and therefore these numbers can be used to anticipate call volumes and types and to react proactively to changing conditions at the call center before they occur.

Therefore, according to one aspect of the invention, in a communications system that comprises a server for a client-server data network (e.g., the Word-Wide Web) that includes the server and a plurality of clients of the server and wherein the server provides the clients with items of information (e.g., Web pages) requested by the clients, and that further comprises a call center for handling calls relating to the items of information received from the clients via a telephone network, the server is communicatively connected with the call center and the server responds to receipt of requests from clients for items of information by sending notifications of the requests to the call center, and the call center (e.g., an information management system thereof) responds to receipt of the notifications by storing the received notifications for use in predicting a volume of calls (and/or callback requests) that will soon need to be handled by the call center and staffing the call center in anticipation of the predicted volume of calls. Illustratively, this information can be used either manually or as input into an expert system to suggest to the call-center supervisor what staffing or assignment changes should be anticipated before the calls or callback requests actually arrive.

This information can also be used in conjunction with knowledge of information about the content of the Web pages to select agent skills that are most appropriate for the types of calls likely to be arriving. Accordingly, each notification preferably identifies the requested item of information, and the call center stores the identification generally for use in predicting types of calls to be handled by the call center and staffing agent splits of the call center in anticipation of the predicted types, and specifically for use in predicting agent skills needed to handle the predicted call volume and staffing the call center with agents having the predicted skills in anticipation of the predicted call volume.

By being able to anticipate calls before they occur, a supervisor (or an expert system working on his or her behalf) can make staffing changes in advance to better align the call center's agents to answer calls (or service the callback requests). Similarly, if the data show that the number of calls from the data network clients will be decreasing, agents can be moved to handle other calls within the call center. Since the data network clients must always have at least one page hit before engaging an agent or requesting a callback (and, more typically, they will browse through several pages on the Web site before making a call request), the page hits can be used as a preindication of call activity that will eventually arrive at the call center.

Call centers can, over time, record the ratio of page hits to call or callback requests and can apply this ratio to anticipate the calls that are likely to arrive in the future. Accordingly, the clients selectively indicate to the server requests for calls to the call center (e.g., by actuating a "call" virtual button associated with a received Web page). Preferably, the server responds to receipt of such requests by sending notifications thereof to the call center, and the call center responds to receipt of such notifications by storing the received notifications for use in predicting the volume of calls to be handled by the call center and staffing the call center in anticipation of the predicted call volume. Specifically, the received item-request notifications are used together with the call-request notifications to determine a historical ratio of item requests-to-calls, and this ratio is then used to predict from recent item-request notifications the volume of calls to be handled by the call center. This ratio can be applied to Web hits in real time and can create threshold alerts to a call center supervisor if the agent pool is insufficient to handle the anticipated call volume.

An automated version of this feature uses expert system technology. An expert system collects the appropriate data, applies the historical ratios, and suggests staffing changes within the call center that the supervisor can confirm. Or it can run in a fully-automated mode and simply execute the staffing changes that it predicts.

A server for a client-server data network communicates with clients over the data network to receive requests for items of information (e.g., page hits) from the clients and to send the requested items to the requesting clients. According to another aspect of the invention, this server further responds to the received requests by sending notifications of the requests (page hits) to a call center that handles calls relating to the requested items. The server preferably also receives requests for calls to the call center from the clients and effects the requested calls and further responds to the received call requests by sending notifications of the requests to the call center.

A call center for handles calls relating to items of information provided by a server to clients who request the items of information in a client-server data network. According to a further aspect of the invention, the call center further communicates with the server to receive therefrom notifications of requests (e.g., page hits) received by the server from the clients for items of information, and stores the received notifications for use in predicting a volume of calls to be handled by the call center and staffing the call center in anticipation of the predicted call volume. The call center preferably also receives from the server notifications of requests for calls to the call center received by the server from the clients and also stores these received notifications for use in predicting the call volume.

According to yet another aspect of the invention, communications methods corresponding to the apparatus functions characterized above are effected.

These and other advantages and features of the invention will become more apparent from the following description of an illustrative embodiment of the invention considered together with the drawing.

DETAILED DESCRIPTION

Figure 1:
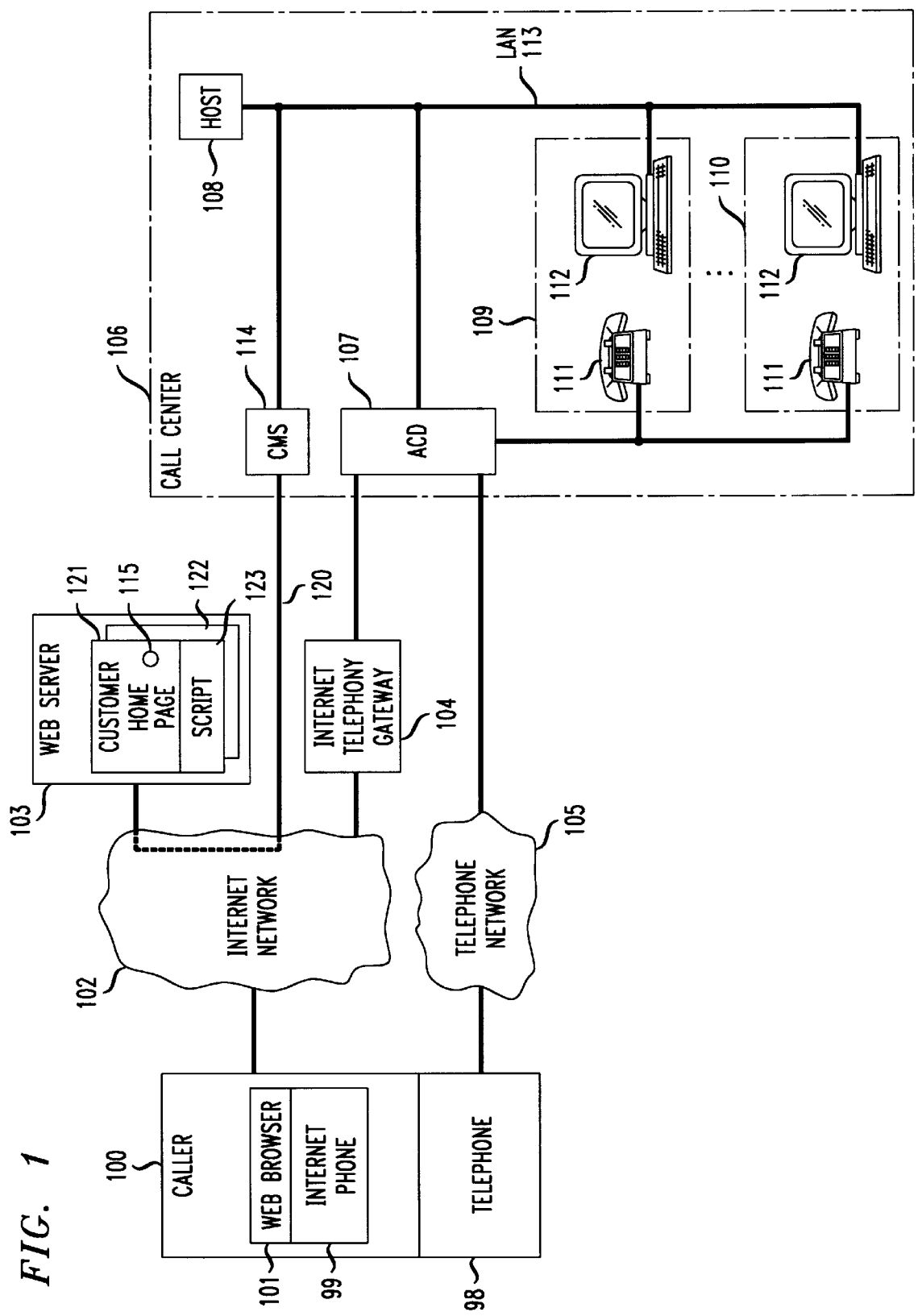
FIG. 1 is a block diagram of a communications network that implements an illustrative embodiment of the invention.

FIG. 1 shows a combined data-and-telephony communications network. The data portion of the network comprises at least one client machine, such as a personal computer, referred to as a caller 100, interconnected with at least one World-Wide Web server machine, such as a computer, referred to as a Web server 103, by the Internet data communications network, referred to as the Internet 102. Together, elements 100–103 form a client-server data network. Caller 100 is equipped either with an Internet phone 99 or with a standard telephone or a computer-implemented "soft phone" 98, and also executes a World-Wide Web browser program, referred to as a Web browser 101. The telephony portion of the communications network of FIG. 1 comprises the public telephone system 105, a conventional call center 106 connected to telephone system 105, and telephone 98 connected to telephone system 105.

Call center 106 conventionally includes an automatic call distributor (ACD) 107 and call management system (CMS) 114 connected to and serving a plurality of call center agent positions 109–110. Each agent position 109–110 includes a telephone 111 connected to ACD 107 for receiving voice calls, and a data terminal 112 connected by a local area network (LAN) 113 for receiving data, such as caller's records from a host computer 108. Alternatively, the telephone and data terminal are combined into a single instrument, such as a display telephone or a personal computer equipped with a "soft phone". ACD 107 and CMS 114 are interconnected by LAN 113 so that CMS 114 can collect information on the operation of call center 106 from ACD 107, in a conventional manner.

ACD 107 and Internet 102 are interconnected by an Internet telephony gateway (ITG) 104 which converts Internet voice calls from Internet phone 99 to telephone calls and vice versa. Telephony gateway 104 is illustratively the Lucent Technologies Inc. Internet Telephony Gateway, or a modified version of the Lucent Technologies Inc. Definity ® Enterprise Communications Server. ACD 107 is illustratively a Lucent Technologies Inc. Definity Enterprise Communications Server ACD, and CMS 114 is illustratively the Lucent Technologies Inc. Centre Vu Call Management System. Illustratively, ITG 104 and call center 106 comprise the Lucent Technologies Inc. Internet call center.

Web server 103 includes a Web home page 121 and zero or more additional Web pages 122 for a client of call center 106, which may be accessed by caller 100 via Web browser 101 over Internet 102, in a conventional manner. Home page 121 and zero or more pages 122 each has a conventional hypertext markup language (HTML) capability—such as a "call" virtual button 115—by means of which a user of Web browser 101 can indicate a request to speak to an agent of call center 106.

As described so far, the communications system of FIG. 1 is conventional.

According to the invention, CMS 114 is connected by a data link 120 through Internet network 102 to Web server 103, by means of which connection Web server 103 reports Web page "hits" and call requests to CMS 114. Each of the call-center client's Web pages 121, 122 that has a "call" virtual button 115 includes a Common Gateway Interface (CGI) script 123 that is invoked each time a caller 100 accesses the page and also each time a caller 100 actuates "call" button 115 of that page. Execution of script 123 causes Web server 103 to report to CMS 114 either that the corresponding page has been accessed or that the corresponding page's button 115 was actuated. Button 115 may function as a "call-back" button whose actuation results in a callback request being sent to ITG 104 or ACD 107. A call is then automatically placed back from ACD 107 to caller 100. Alternatively, button may function as a "make call" button whose actuation results in a call from caller 100 being extended to ACD 107, illustratively in the manner disclosed in a patent application of J. E. Coffman et al., entitled "Extending Internet Calls to a Telephony Call Center", U.S. Ser. No. 08/749298, filed on Nov. 14, 1996, which is hereby incorporated herein by reference. Therefore, as used herein, the term "calls" includes call-back requests.

Figure 2:
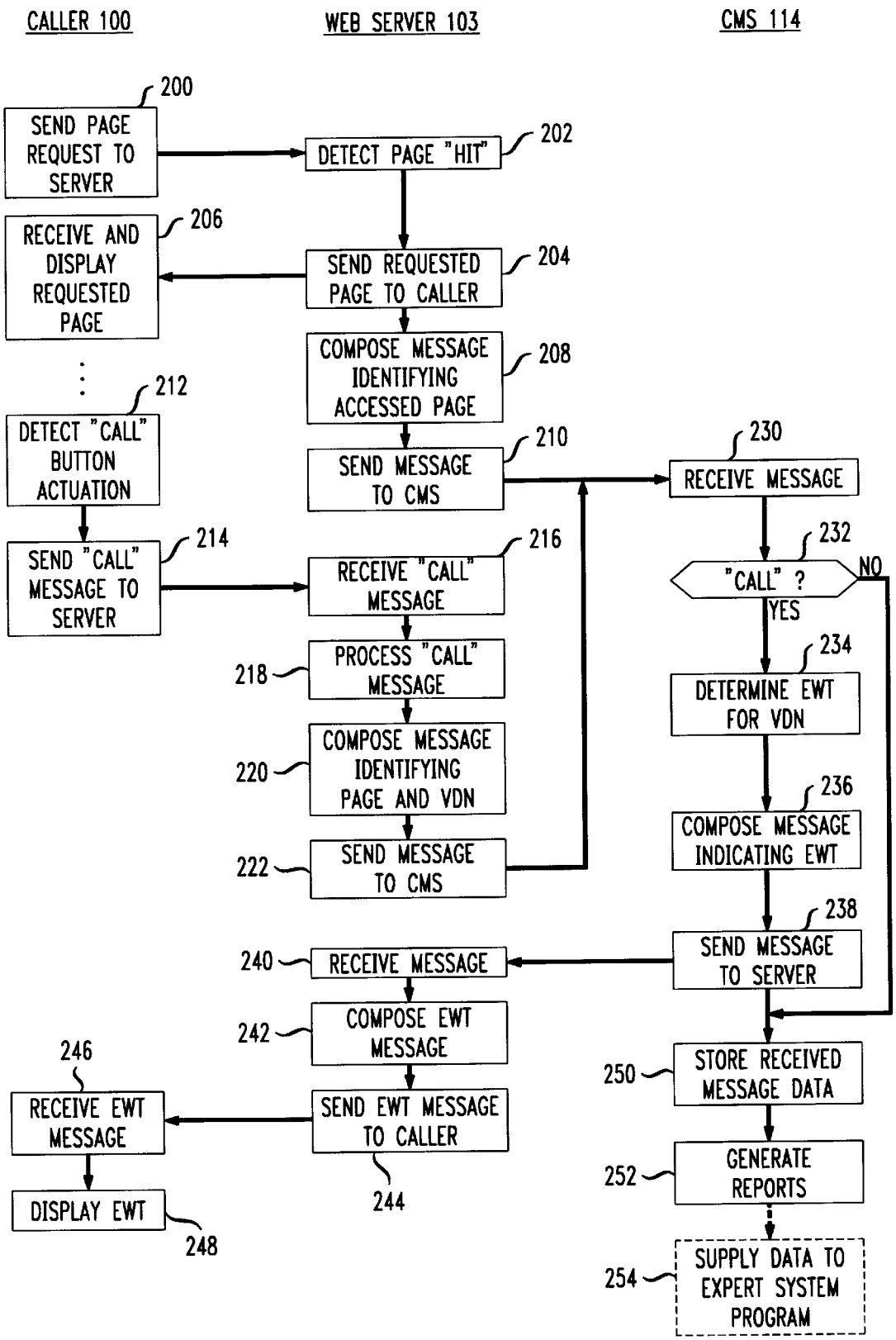
FIG. 2 is a block diagram of operations of units of the communications network of FIG. 1 that implement the illustrative embodiment of the invention.

The reports sent by Web server 103 to CMS 114 are substantially real-time indications of each page 121, 122 hit and "call" button 115 actuation. The interactions between Web server 103, caller 100, and CMS 114 that effect supplying call center 106 and its supervisors with information predictive of anticipated call volume and call types are shown in FIG. 2. When Web browser 101 of caller 100 sends a Web page request to Web server 103, at step 200, Web server 103 detects the request (a page "hit"), at step 202, and sends the requested Web page 121, 122 to caller 100, at step 204. Caller 100 receives the Web page and displays it, at step 206. Meanwhile, Web server 103 also executes script 123 associated with the requested page 121, 122. This causes Web server 103 to compose a message identifying the accessed (requested and sent) Web page 121, 122, at step 208, and to send this message to CMS 114 via Internet network 102 and data link 120, at step 210.

CMS 114 receives the message, at step 230, and checks whether it indicates actuation of a "call" button 115, at step 222. The message sent at step 210 does not indicate actuation of a button 115, so CMS 114 merely stores the message data, e.g., the Web page identifier and the time when the message was sent, at step 250.

When Web browser 101 of caller 100 detects actuation by a user of "call" button 115 of the Web page that it received at step 206, at step 212, it sends a call-request message indicative of that actuation to Web server 103, at step 214. Web server 103 receives the call-request message, at step 216, and processes it, at step 218, as necessary to effect establishment of a call between caller 100 and call center 106. Web server 103 also executes script 123 associated with the Web page 121, 122 whose button 115 was actuated. This causes Web server 103 to compose a message identifying that Web page 121, 122 and the vector directory number (VDN) that is associated with the actuated button 115, at step 220, and to send this message to CMS 114, at step 222.

CMS 114 receives the message again at step 230, and checks whether it indicates a button 115 actuation, at step 222. The message sent at step 222 does indicate a button 115 actuation, so CMS 114 determines the estimated wait time (EWT) of the call established as a consequence of step 218, at step 234. The EWT is illustratively determined in the manner disclosed in U.S. Pat. No. 5,506,898 which is hereby incorporated herein by reference. CMS 114 then composes a message indicating the determined EWT, at step 236, and sends it to Web server 103 via data link 120 and Internet network 102, at step 238. Web server 103 receives the message, at step 240, composes a new message indicating the EWT, at step 242, and sends the new message to caller 100, at step 244. Caller 100 receives it, at step 246, and displays the EWT, at step 248.

Alternatively, steps 232–248 may be eliminated.

Meanwhile, CMS 114 stores the message contents of the message which it received at step 230, e.g., the Web page identifier, the VDN, and the time when the message was sent, at step 250. CMS 114 uses this stored data along with other, conventional, call center 106 data to generate reports for the call center supervisors, at step 252, including reports on historical ratios of numbers of hits and numbers of calls resulting from those hits. A supervisor of call center 106 can use reports on current (recent) numbers of hits on the client's pages along with the historical ratios of page hits to calls ("call" button 115 actuations) as a predictor of the volume of calls that call center 106 will soon have to handle, and make corresponding agent staffing changes in anticipation thereof. Also, from knowing either the identity of accessed pages or the VDNs to which calls are being placed or the types of agent skills that are typically needed by calls initiated from a particular page, the supervisor of call center 106 can use reports on current numbers of hits on individual pages 121 and 212, along with the historical ratios of page hits to calls for the individual pages, as a predictor of the types of skills that will be needed to handle the anticipated calls and assign various agents to various call center splits accordingly.

Additionally, call center 106 may include a scheduling and adherence expert-system program, executing either on CMS 114 or on some other unit of call center 106, which automatically computes present and future call center and split agent-staffing and agent-skill needs and agent schedules. In that case, call center 106 supplies the data that it has collected and stored to this program, at step 254, so that the program can compute anticipated staffing changes for call center 106.

Of course, various changes and modifications to the illustrative embodiment described above will be apparent to those skilled in the art. For example, the information reported by the Web server to the call center may include information to general Web-site traffic flows, e.g., patterns of hits, etc. Such changes and modifications can be made without departing from the spirit and the scope of the invention and without diminishing its attendant advantages. It is therefore intended that such changes and modifications be covered by the following claims.

What is claimed is:

1. A communications system comprising:

a server for a client-server data network that includes the server and a plurality of clients of the server wherein the server provides the clients with items of information requested by the clients;

a call center for receiving calls relating to the items of information from the clients via a telephone network and handling the calls;

a communications connection connecting the server with the call center;

the server being responsive to receiving requests from clients for items of information including page request that are not request for calls to the call center by sending notifications of the requests via the communications connection to the call center; and the call center being responsive to receiving the notifications by storing the received notifications for use in predicting a volume of calls to be handled by the call center and staffing the call center in anticipation of the predicted volume of calls.

2. The system of claim 1 wherein:

each said notification identifies the requested item of information, and the call center stores the received notifications further for use in predicting types of calls to be handled by the call center and staffing agent splits of the call center in anticipation of the predicted types.

3. The system of claim 1 wherein:

each said notification identifies the requested item of information, and the call center stores the received notifications further for use in predicting agent skills needed to handle the predicted volume of calls and staffing the call center with agents having the predicted skills in anticipation of the predicted volume of calls.

4. The system of claim 1 wherein:

the clients selectively indicate to the server requests for calls to the call center;

the server is further responsive to receiving requests from the clients for calls to the call center by sending notifications of the call requests via the communications connection to the call center; and the call center is further responsive to receiving the notifications of the call requests by storing the received notifications of the call requests for use in predicting the volume of calls to be handled by the call center and staffing the call center in anticipation of the predicted volume of calls.

5. The system of claim 4 wherein:

the call center stores the received item request notifications and call request notifications for use in determining a ratio of item requests to calls and predicting from the received item request notifications and the ratio the volume of calls to be handled by the call center.

6. The system of claim 4 wherein:
the call center responds to receipt of a call request notification by determining an estimated wait time of the requested call in the call center and notifying the server of the estimated wait time; and
the server responds to the notification of the estimated wait time by notifying the client who requested the call of the estimated wait time.

7. A communications system comprising:
a Web page server for a data network that implements a World Wide Web and includes the server and a plurality of clients of the server and wherein the server provides the clients with Web pages requested by the clients and the clients selectively indicate to the server via the provided Web pages requests for calls relating to the provided Web pages;
a call center for receiving the calls from the clients via a telephone network and handling the calls, the call center being communicatively connected to the server;
the server being responsive to receipt of requests from clients for Web pages including Web page request that are not request for calls to the call center by sending notifications identifying the requested Web pages to the call center, and being responsive to receipt of call requests from the clients by sending notifications identifying the Web pages via which the call requests were made to the call center; and
the call center being responsive to receipt of the notifications by storing the notifications for use in determining a ratio of Web page requests to calls and predicting from the determined ratio and the page request notifications a volume of calls to be handled by the call center and staffing the call center in anticipation of the predicted volume of calls.

8. The system of claim 7 wherein:
the call center stores the received notifications further for use in predicting types of calls to be handled by the call center and staffing agent splits of the call center in anticipation of the predicted types.

9. The system of claim 8 wherein:
each said call request notification further identifies a telephone number of the call center to which the requested call is directed.

10. The system of claim 7 wherein:
the call center stores the received notifications further for use in predicting agent skills needed to handle the predicted volume of calls and staffing the call center with agents having the predicted skills in anticipation of the predicted volume of calls.

11. The system of claim 10 wherein:
each said call request notification further identifies a vector directory number of the call center to which the requested call is directed.

12. A server for a client-server data network, comprising:
means for communicating with clients over the data network to receive requests from the clients for items of information including page requests that are not requests for calls to a call center that handles calls relating to the requested items and to send the requested items to the requesting clients; and
means responsive to the received requests for items of information for sending notifications of the requests to the call center.

13. The server of claim 12 wherein:
the communicating means further receive requests for calls to the call center from the clients, and
the sending means are further responsive to the received requests for calls by sending notifications of the requests to the call center.

14. A call center for handling calls relating to items of information provided by a server to clients who request the items in a client-server data network, comprising:
means for communicating with the server to receive from the server notifications of requests received by the server from the clients for items of information including page request that are not request for calls to the call center; and
means responsive to receipt of the notifications of the requests for items of information, for storing the notifications for use in predicting a volume of calls to be handled by the call center and staffing the call center in anticipation of the predicted volume of calls.

15. The call center of claim 14 wherein
the communicating means further communicate with the server to receive from the server notifications of requests for calls to the call center received by the server from the clients.

16. A communications method in a system comprising a client-server data network that includes a server and a plurality of clients of the server, a call center communicatively connected to the server, and a telephone network interconnecting the call center with the clients, the method comprising the steps of:
in response to receiving requests for items of information calls to the call center from clients via the data network, the server providing the clients with the requested items of information via the data network;
further in response to the receiving, the server notifying the call center of the requests; and
in response to receiving the notifications, the call center storing the notifications for use in predicting a volume of calls, relating to the items of information, to be handled by the call center and staffing the call center in anticipation of the predicted volume of calls.

17. A communication method in a system comprising a client-server data network that includes a server and a plurality of clients of the server, a call center communicatively connected to the server, and a telephone network inter-connecting the call center with the clients, the method comprising the steps of:
receiving at the server a request for an item of information including a page request that is not a request for a call to the call center from a client via the data network;
in response to the receiving, the server sending the requested item to the requesting client via the data network; and
further in response to the receiving, the server sending a notification of the request to the call center.

18. The communication method of claim 17 further comprising the steps of:
receiving at the server via the data network a second request from the client for a call, relating to the item of information, to the call center;
in response to the receiving, the server effecting the requested call; and
further in response to the receiving, the server sending a notification of the second request to the call center.

19. A communication method in a system comprising a client-server data network that includes a server and a plurality of clients of the server, a call center communicatively connected to the server, and a telephone network interconnecting the call center with the clients, the method comprising the steps of:

receiving at the call center notifications from the server of requests received by the server from clients for items of information including page request that are not requests for calls to the call center; and in response to the receipt, the call center storing the received notifications for use in predicting a volume of calls, relating to the items of information, to be handled by the call center and staffing the call center in anticipation of the predicted volume of calls.

20. The communication method of claim 19 further comprising the steps of:

receiving at the call center second notifications from the server of requests for calls to the call center received by the server from the clients; and in response to the receipt of the second notifications, the call center storing the received second notifications for use in predicting the volume of the calls and staffing the call center in anticipation of the predicted volume of the calls.

21. A call center for performing the method of claim 16 or 17 or 18 or 19 or 20.

* * * * *